US012618490B2

(12) United States Patent
Mason et al.

(10) Patent No.: US 12,618,490 B2
(45) Date of Patent: May 5, 2026

(54) CAM DRIVEN FLUID VALVE ASSEMBLY

(71) Applicant: Robert Bosch GmbH, Stuttgart (DE)

(72) Inventors: Paul Mason, Dearborn, MI (US);
David Toutant, Grosse Pointe Woods,
MI (US); Chris Franklin, Canton, MI
(US); Hank Brockner, Grosse Isle, MI
(US); Markus Vollmer, Appenweir
(DE); Stephen Zukowski, Howell, MI
(US); Thomas R Chapman,
Templeton, MA (US)

(73) Assignee: Robert Bosch GmbH, Stuttgart (DE)

( * ) Notice: Subject to any disclaimer, the term of this
patent is extended or adjusted under 35
U.S.C. 154(b) by 16 days.

(21) Appl. No.: 18/754,680

(22) Filed: Jun. 26, 2024

(65) Prior Publication Data

US 2026/0002606 A1     Jan. 1, 2026

(51) Int. Cl.
*F16K 31/524*      (2006.01)
*F16K 31/528*      (2006.01)
*F01P 7/14*         (2006.01)

(52) U.S. Cl.
CPC .. *F16K 31/52475* (2013.01); *F16K 31/52483*
(2013.01); *F16K 31/5286* (2013.01); *F01P*
*2007/146* (2013.01); *Y10T 137/86759*
(2015.04)

(58) Field of Classification Search
None
See application file for complete search history.

(56) References Cited

U.S. PATENT DOCUMENTS

| | | | | | |
|---|---|---|---|---|---|
| 2,235,990 | A | * | 3/1941 | Guttery | F16K 31/5286 74/59 |
| 2,423,393 | A | * | 7/1947 | Lauck | F16K 31/52416 91/457 |
| 3,185,435 | A | * | 5/1965 | Hauser | F16K 3/184 251/232 |
| 3,894,715 | A | * | 7/1975 | Whittaker | F16K 5/204 251/231 |
| 4,007,757 | A | * | 2/1977 | Emmert | F16K 31/524 137/868 |
| 4,262,879 | A | * | 4/1981 | Gonner | F15C 3/02 137/881 |

(Continued)

FOREIGN PATENT DOCUMENTS

| | | |
|---|---|---|
| DE | 102014204120 | 9/2015 |
| ES | 1237579 | 11/2019 |
| WO | 2023025548 | 3/2023 |

*Primary Examiner* — Matthew W Jellett
(74) *Attorney, Agent, or Firm* — Kelly McGlashen

(57) ABSTRACT

A cam-driven valve assembly includes a valve housing that
defines a plurality of fluid passageways and supports an
array of fluid valves in the fluid passageways to control the
flow of fluid therethrough. The assembly includes a plurality
of cams supported on a cam shaft. The cam shaft is arranged
so that each cam is associated with a corresponding valve.
Rotation of the cam shaft results in actuation of the valves
via the cams. Each cam includes a pair of cam disks that
cooperate to define an internal cam track. A valve body of
each fluid valve includes a cam follower that is received in
the cam track of a corresponding cam. The cam tracks may
be configured such that at least one of the valves is actuated
at time that is different relative to an actuation time of
another valve.

17 Claims, 9 Drawing Sheets

(56) References Cited

U.S. PATENT DOCUMENTS

| | | | | |
|---|---|---|---|---|
| 4,844,127 | A * | 7/1989 | Horsch | F16H 61/0276 |
| | | | | 137/637.1 |
| 5,230,367 | A * | 7/1993 | Minch | F16L 55/02718 |
| | | | | 137/625.33 |
| 6,062,826 | A * | 5/2000 | Morimoto | F16K 31/52408 |
| | | | | 137/624.13 |
| 6,095,192 | A * | 8/2000 | Gleasman | F04B 1/14 |
| | | | | 137/625.68 |
| 8,869,832 | B2 * | 10/2014 | Baumann | F16K 47/08 |
| | | | | 137/625.33 |
| 10,788,143 | B2 | 9/2020 | Biester et al. | |
| 2005/0218359 | A1 * | 10/2005 | Davis | F15B 15/068 |
| | | | | 251/29 |
| 2015/0225259 | A1 * | 8/2015 | Yamaoka | B01J 49/75 |
| | | | | 137/865 |
| 2016/0017808 | A1 | 1/2016 | Chabaille et al. | |
| 2016/0091109 | A1 * | 3/2016 | Woods | F16K 11/166 |
| | | | | 137/224 |
| 2017/0191581 | A1 | 7/2017 | Brezowsky et al. | |
| 2024/0151318 | A1 * | 5/2024 | Mitri | F16K 11/22 |

* cited by examiner

CAM DRIVEN FLUID VALVE ASSEMBLY

BACKGROUND

In an electric vehicle, a thermal management system can be used to provide heating and/or cooling to control the temperature of various vehicle components, systems and/or compartments. The thermal management of an electric vehicle may be complex. For example, to provide cooling, the thermal management system includes a coolant control system that directs coolant via one or more fluid pumps to and from the vehicle components, systems and/or compartments via a complex system of fluid pipes and fluid valves. To provide heating, the thermal management system includes a refrigerant control system that directs refrigerant through components that provide a refrigeration cycle. In some vehicles, multiport fluid valves may be used to control the flow of fluid through the thermal management system. However, when the thermal management system is sufficiently complex, multiport fluid valves become large in size to accommodate three, eight, twelve, sixteen or more ports as required by the system. In some cases, the size of the fluid valves becomes so large that it may become difficult to meet the packaging requirements of the thermal management system within the vehicle.

SUMMARY

The vehicle thermal management system includes a coolant control system having a cam-driven fluid valve assembly that can be used by the system to direct coolant, for example, to cool a drive motor, a charge air heat exchanger, a battery, power electronics modules, the vehicle passenger cabin and/or other vehicle components or systems that require temperature control.

For purposes of operational and packaging efficiency, it may be useful to combine multiple components of the vehicle thermal management system into a single, integrated module. Such a module may include the coolant control system, the refrigerant control system or both. The coolant control system may include, for example, one or more circulation pumps, a fluid reservoir, one or more fluid valves, a coolant control system controller, sensors, heat exchangers, etc. A housing of the module may include internal passageways that permit fluid communication between the various components of the system included in the module. Portions of the module housing may be configured to replace housing elements of certain components. For example, a portion of the module housing may be used to provide a lid of a fluid valve and/or fluid valve assembly, whereby the fluid valve assembly is connected to the module housing. For other components, the module may be configured to permit the component to "plug into" an appropriately configured portion of the module housing.

In the illustrated embodiment, the cam-driven fluid valve assembly includes a valve housing that may be integrated in the module housing (e.g., at least a portion of the valve housing may be common to the module housing). The valve housing of the cam-driven fluid valve assembly is configured to define a plurality of fluid passageways and to support an array of sliding gate valves in the fluid passageways in such a way that the flow of fluid through the valve housing is controlled. The assembly includes a plurality of lobed cams supported on a cam shaft. The cam shaft may be driven to rotate by an actuator. The cams rotate in concert with the cam shaft and each cam is arranged to control the open/closed state of a corresponding gate valve. Rotation of the cam shaft results in actuation of the valves via the cams and the cams may vary in shape, size and/or contact surface angle to allow for individual valve actuation times and durations. In some embodiments, the cam shaft and cams are arranged to open and close the fluid valves of the assembly in such a way that multiple fluid valves may allow direction of fluid to a single location and/or a single fluid valve may direct fluid to multiple locations depending on the vehicle operating conditions.

The cam-driven fluid valve assembly receives fluid actuated by one or more fluid pumps that may be integrated into the integrated module. The fluid pressures generated by the fluid pumps are sufficiently low that many components of the cam-driven fluid valve assembly, including the stationary plates and/or the movable plates of the gate valves, may be formed of plastic or may be plastic that is reinforced with metal at strategic location, which reduces the cost and weight of the module and improves durability.

In some embodiments, a cam is used to directly open and close the gate valve. Each cam includes a pair of cam discs, which are fixed together in a parallel and spaced-apart configuration. The inward-facing surface of each disc of the pair of cam discs includes a disc groove. Within each pair of cam discs, the disc grooves are mirror images of each other. The disc grooves of the pair of cam discs cooperate to provide an eccentric, internal cam track that at least partially encircles the cam shaft rotational axis. As used herein, the term "eccentric path" refers to a path that deviates from a circular shape and/or is non-concentric with a rotational axis of the cam.

Each sliding gate valve may be mechanically connected to a corresponding cam. The movable plate of the gate valve includes a cam follower. A portion of the cam follower is received within the internal cam track and follows the path as the cam rotates.

The cams along the cam shaft may include an eccentric cam track, and each individual eccentric path can define a different opening and closing profile or sequence for each valve. This allows for individual actuation of each valve. In some embodiments, a subset of the valves may open at different times than the other valves. In other embodiments, each valve may open at a different time than the other valves.

This can be compared to some cam driven fluid valve assemblies in which peripheral surfaces of the cams have protruding lobes that are used to open the valves. In such assemblies, the force from the camshaft pushes against the valve through a pushrod to open the valve. As the valve opens, the valve compresses a spring. The stored energy in the spring is used to push the valve against pushrod, which in turn is pushed against the camshaft lobe. As the camshaft turns and the lobe rotates away from the valve, the valve closes. In this assembly, each valve requires a pushrod and spring, increasing design and manufacturing complexity and cost. In addition, the spring force increases the torque required to turn the camshaft as compared to a spring-free configuration. By connecting the valve to an internal cam track of the cam, springs and push rods can be omitted, whereby assembly is simplified and the torque required to turn the cam shaft is reduced.

In some aspects, a valve assembly includes an assembly housing having valve ports. Each valve port is configured to permit fluid communication between an environment of the assembly housing and an interior space of the assembly housing. The valve assembly includes a cam shaft supported on the assembly housing, the cam shaft configured to rotate about a rotational axis. The cam shaft includes cams that are supported on the cam shaft and rotate in concert with the cam shaft. In addition, the valve assembly includes sliding gate valves. Each sliding gate valve includes a first stationary plate and a movable plate. The first stationary plate has a first plate through-opening and the first stationary plate is disposed in the assembly housing and fixed relative to the assembly housing so as to face a first one of the valve ports. The movable plate has a movable plate through-opening. The movable plate is disposed in the assembly housing in a stacked arrangement with respect to the first stationary plate such that a surface of the movable plate slides along a surface of the first stationary plate upon actuation of the valve between a first position and a second position. In the first position, the movable plate through opening is aligned with the stationary plate through opening and fluid is permitted to flow through the valve port. In the second position, the movable plate through opening is not aligned with the stationary plate through opening and fluid is prevented from flowing through the valve port. The movable plate includes a leg that protrudes toward the cam shaft. The leg terminates in a cam follower that is mechanically enmeshed with one of the cams in such a way that rotation of the cam results in movement of the movable plate within a plane that is parallel to the first stationary plate.

In some embodiments, the one of the cams includes a pair of cam disks that cooperate to define a cam track therebetween, and a portion of the cam follower of the movable plate is received in and engages with the cam track.

In some embodiments, the movable plate of each sliding gate valve is independently connected to a respective one of the cams. Each cam includes a pair of cam disks that cooperate to define a cam track therebetween, and a portion of the cam follower of each movable plate is received in the cam track of the respective one of the cams.

In some embodiments, the cam track of each cam is configured such that at least one of the sliding gate valves is actuated at time that is different relative to an actuation time of another sliding gate valve.

In some embodiments, a peripheral surface of each cam includes an opening that communicates with the cam track. The opening is configured to permit the respective cam follower to enter the cam track for assembly.

In some embodiments, the cam discs of each pair of cam disks have interlocking structures that prevent a first cam disc of the pair of cam discs from rotating relative to a second cam disc of the pair of cam discs.

In some embodiments, the rotational axis is disposed in the plane.

In some embodiments, the movable plate is configured to be driven by the cam to reciprocate along a radius of the cam shaft.

In some embodiments, the amount of fluid flow through the valve is made variable by selectively positioning the movable plate at a location between the first position and the second position.

In some embodiments, the sliding gate valves include a first sliding gate valve and a second sliding gate valve, and the movable plate of the first sliding gate valve and the movable plate of the second sliding gate valve are coplanar and on a common side of the rotational axis.

In some embodiments, the sliding gate valves include a first sliding gate valve and a second sliding gate valve, and the movable plate of the first sliding gate valve and the movable plate of the second sliding gate valve are coplanar and offset relative to each other along the rotational axis.

In some embodiments, each sliding gate valve includes a second stationary plate having a second plate through-opening. The second stationary plate is parallel to the first stationary plate. The second stationary plate is disposed in the assembly housing and fixed relative to the assembly housing so as to face a second one of the ports with the second plate through opening aligned with the first plate through-opening. The moveable plate is disposed between the first stationary plate and the second stationary plate.

In some embodiments, a fluid tight seal exists between the moveable plate and each of the first stationary plate and the second stationary plate.

In some embodiments, the valve assembly includes a first valve seal that is disposed between the first stationary plate and the assembly housing. The first valve seal surrounds a first one of the valve ports and provides a fluid tight seal between the first stationary plate and the assembly housing. In addition, the valve assembly includes a second valve seal that is disposed between the second stationary plate and the assembly housing. The second valve seal surrounds a second one of the valve ports and provides a fluid tight seal between the second stationary plate and the assembly housing.

In some embodiments, the first one of the valve ports and the second one of the valve ports are aligned, and a fluid valve that includes the first stationary plate and the second stationary plate is disposed between the first one of the valve ports and the second one of the valve ports.

In some aspects, a valve assembly includes an assembly housing having ports. Each port is configured to permit fluid communication between an environment of the assembly housing and an interior space of the assembly housing. The valve assembly includes a cam shaft supported on the assembly housing. The cam shaft extends into the interior space and is configured to rotate about a rotational axis. The valve assembly includes cams that are disposed in the interior space and supported on the cam shaft. Each cam is configured to rotate in concert with the cam shaft. Each cam has an internal groove that defines a cam track. The cam track at least partially encircles the rotational axis. In addition, the valve assembly includes sliding gate valves. Each sliding gate valve is associated with a respective one of the cams. Each sliding gate valve includes a first stationary plate and a movable plate. The first stationary plate has a first plate through-opening. The first stationary plate is disposed in the assembly housing and is fixed relative to the assembly housing so as to face a first one of the ports. The movable plate has a movable plate through-opening. The movable plate is disposed in the assembly housing in a stacked arrangement with respect to the first stationary plate such that a surface of the movable plate slides along a surface of the first stationary plate upon actuation of the valve between a first position in which the movable plate through opening is aligned with the first plate through opening and fluid is permitted to flow through the sliding gate valve, and a second position in which the movable plate through opening is not aligned with the first plate through opening and fluid is prevented from flowing through the sliding gate valve. The movable plate is mechanically connected to the internal groove of the respective one of the cams. The movable plate is moveable relative to the first stationary plate upon rotation of the cam about the cam shaft.

In some embodiments, the movable plate includes a leg that protrudes toward the cam shaft. The leg terminates in a cam follower that resides in the cam track of the respective one of the cams. The engagement between the cam follower and the cam track provides the mechanical connection.

In some embodiments, a distance of the cam track of a respective one of the cams from the rotational axis varies along a length of the cam track.

In some embodiments, when the distance of the cam track from the rotational axis is at a minimum, the movable plate is in the second position, and In some embodiments, when the distance of the cam track from the rotational axis is at a maximum, the movable plate is in the first position.

In some embodiments, at least one cam includes a first cam disc fixed to a second cam disc. The first cam disc includes an inner surface that faces the second cam disc. The inner surface of the first cam disc defines a first groove. The second cam disc includes an inner surface that faces the first cam disc. The inner surface of the second cam disc defines a second groove. The first groove and the second groove cooperate to provide the internal groove of the at least one cam.

In some aspects, a valve assembly includes an assembly housing having ports, each port configured to permit fluid communication between an environment of the assembly housing and an interior space of the assembly housing. The valve assembly includes a cam shaft supported on the assembly housing. The cam shaft extends into the interior space and is configured to rotate about a rotational axis. The cams are disposed in the interior space and supported on the cam shaft. Each cam is configured to rotate in concert with the cam shaft. Each cam has an internal groove that defines a cam track and the cam track at least partially encircles the rotational axis. In addition, the valve assembly includes valves. Each valve is associated with a respective one of the cams. Each valve includes a valve seat having a valve seat through-opening. The valve seat is disposed in the assembly housing and is fixed relative to the assembly housing so as to face a first one of the ports. Each valve includes a valve body that is movable relative to the valve seat. The valve body is disposed in the assembly housing and is movable with the assembly housing between a first position in which fluid is permitted to flow through the valve seat through opening, and a second position in which fluid is prevented from flowing through the valve seat through opening. The valve body is mechanically connected to the cam track of the respective one of the cams and the valve body is moveable relative to the valve seat upon rotation of the cam about the cam shaft.

In some embodiments, each cam comprises a first cam disc fixed to a second cam disc. The first cam disc includes a first cam inner surface that faces the second cam disc, a first cam outer surface that faces away from the second cam disc and a first cam peripheral surface that extends between the first cam inner surface and the first cam outer surface. The first cam disc also includes a first cam through opening that extends between the first cam inner surface and the first cam outer surface and receives the cam shaft therethrough, and a first cam groove formed in the first cam inner surface. The first cam groove defines a first path that surrounds at least a portion of the first cam through opening. The second cam disc includes a second cam inner surface that faces the first cam disc, a second cam outer surface that faces away from the first cam disc and a second cam peripheral surface that extends between the second cam inner surface and the second cam outer surface. The second cam disc also includes a second cam through opening that extends between the second cam inner surface and the second cam outer surface and receives the cam shaft therethrough, and a second cam groove formed in the second cam inner surface. The second cam groove defines a second path that surrounds at least a portion of the second cam through opening. The first cam groove and the second cam groove cooperate to form the cam track.

In some embodiments, the cam track is eccentric.

In some embodiments, the second cam groove has a profile that corresponds to a mirror image of the profile of the first cam groove.

In some embodiments, a distance of the first cam groove from the rotational axis varies along a circumference of the first cam disc.

In some embodiments, when the distance of the first cam groove from the rotational axis is at a minimum, the movable plate is in the second position, and when the distance of the first cam groove from the rotational axis is at a maximum, the movable plate is in the first position.

In some embodiments, the first cam peripheral surface and the second cam peripheral surface provide bearing surfaces that rotatably support the cam with respect to an inner surface of the assembly housing.

In some embodiments, the first cam groove defines a first inner race that is parallel to the rotational axis and disposed between the rotational axis and the first cam peripheral surface. The distance of the first inner race from the rotational axis varies along a circumference of the first cam disc. The first cam groove defines a first outer race that is parallel to the rotational axis and disposed between the first inner race and the first cam peripheral surface. In addition, the distance of the first outer race from the first inner race varies along a circumference of the first cam disc.

In some embodiments, each cam comprises a first cam disc fixed to a second cam disc. The first cam disc and the second cam disc are mechanically joined together by a collar that maintains a gap between the first cam disc and the second cam disc.

In some embodiments, each cam comprises a first cam disc fixed to a second cam disc. The first cam disc and the second cam disc are mechanically joined together by a collar that retains the first cam disc in a desired rotational orientation and axial spacing relative to the second cam disc.

In some embodiments, the collar has a collar through hole that receives the cam shaft therein.

In some embodiments, an inner surface of the collar through hole has a cross-sectional shape and dimensions configured so that the collar rotates in concert with the cam shaft.

In some embodiments, the collar through hole is centered on the rotational axis.

In some embodiments, each cam comprises a first cam disc fixed to a second cam disc. The first cam disc includes a collar that protrudes from the first cam inner surface. The collar surrounds the first cam through opening. An outer surface of the collar has a surface feature that engages an inner surface of the second cam through opening whereby the first cam disc is retained in a desired rotational orientation and axial spacing relative to the second cam disc.

In some embodiments, the valves comprise at least one sliding gate valve. Each sliding gate valve includes a first stationary plate and a movable plate. The first stationary plate provides the valve seat. The first stationary plate has a first plate through-opening and is disposed in the assembly housing and fixed relative to the assembly housing so as to face a first one of the valve ports. The movable plate provides the valve body. The movable plate has a movable plate through-opening. The movable plate is disposed in the assembly housing in a stacked arrangement with respect to the first stationary plate such that a surface of the movable plate slides along a surface of the first stationary plate upon actuation of the valve between a first position and a second position. In the first position, the movable plate through opening is aligned with the stationary plate through opening and fluid is permitted to flow through the valve port. In the second position, the movable plate through opening is not aligned with the stationary plate through opening and fluid is prevented from flowing through the valve port. The movable plate includes a leg that protrudes toward the cam shaft. The leg terminates in a cam follower that is mechanically enmeshed with the cam track of a respective one of the cams in such a way that rotation of the cam results in movement of the movable plate within a plane that is parallel to the first stationary plate.

In some embodiments, the valves include a second stationary plate having a second plate through-opening. The second stationary plate is parallel to the first stationary plate and is disposed in the assembly housing. The second stationary plate is fixed relative to the assembly housing so as to face a second one of the ports and such that the second plate through opening is aligned with the first plate through-opening. The moveable plate is disposed between the first stationary plate and the second stationary plate.

In some embodiments, a first valve seal is disposed between the first stationary plate and the assembly housing. The first valve seal surrounds a first one of the valve ports and provides a fluid tight seal between the first stationary plate and the assembly housing. In addition, a second valve seal is disposed between the second stationary plate and the assembly housing. The second valve seal surrounds a second one of the valve ports and provides a fluid tight seal between the second stationary plate and the assembly housing.

DETAILED DESCRIPTION

Figures 1, 2:
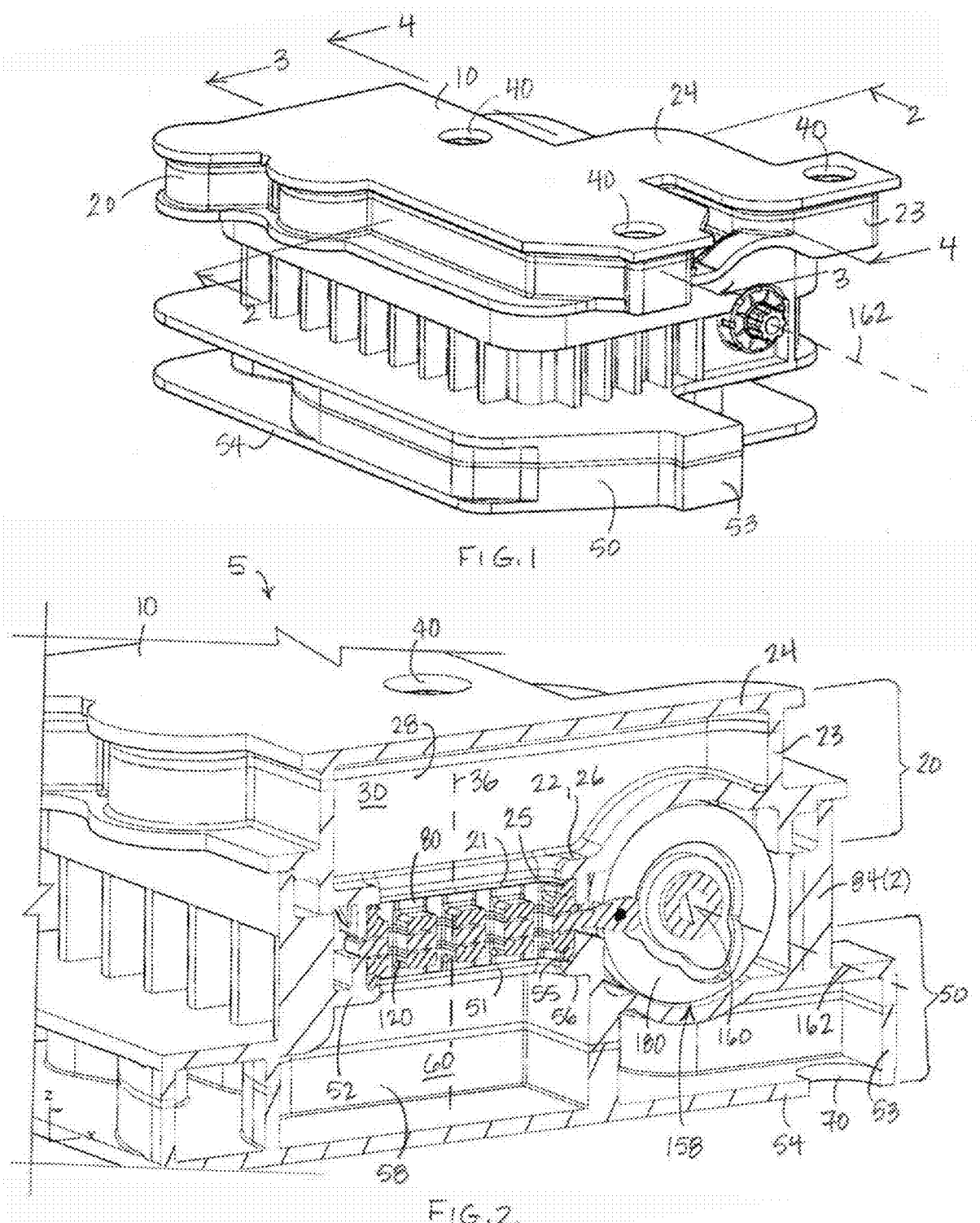
FIG. 1 is a perspective view of cam-driven fluid valve assembly.
FIG. 2 is a perspective cross-sectional view of the cam-driven fluid valve assembly as seen along line 2-2 of FIG. 1.

Referring to FIG. 1, a cam-driven fluid valve assembly 5 can be used to control fluid flow in a fluid circuit such as may be found in a vehicle thermal management system, for example to control coolant flow through a coolant circuit. In some embodiments, the valve assembly 5 may be a stand-alone component that can be connected to fluid lines of the fluid circuit. In the illustrated embodiment, the valve assembly 5 is integrated into a module that also includes other components of the vehicle thermal management system and integrates them into a single, integrated unit.

Referring to FIGS. 2-10, the valve assembly 5 includes an assembly housing 10 that is configured to house sliding gate valves 120 and a cam drive assembly 158 that is actuated by a motor (not shown). The cam drive assembly 158 includes a cam shaft 160 and cams 180 which drive the sliding gate valves 120 in such a way that fluid flow through the assembly housing 10 is controlled.

The assembly housing 10 is a multilayer structure that includes a first manifold 20, a second manifold 50 and a valve chamber 80. The assembly housing 10 has a stacked or layered configuration in which the first manifold 20 overlies the second manifold 50 such that the valve chamber 80 is defined therebetween. References to direction used herein such as above, below, over, under, overlying, underlying, etc., are made with respect to the orientation of the valve assembly 5 as shown in FIGS. 1 and 2. The orientation of the valve assembly 5 is not limited to that shown in FIGS. 1 and 2, and the references to direction are relative only and are not intended to be limiting.

Figures 5, 6, 7:
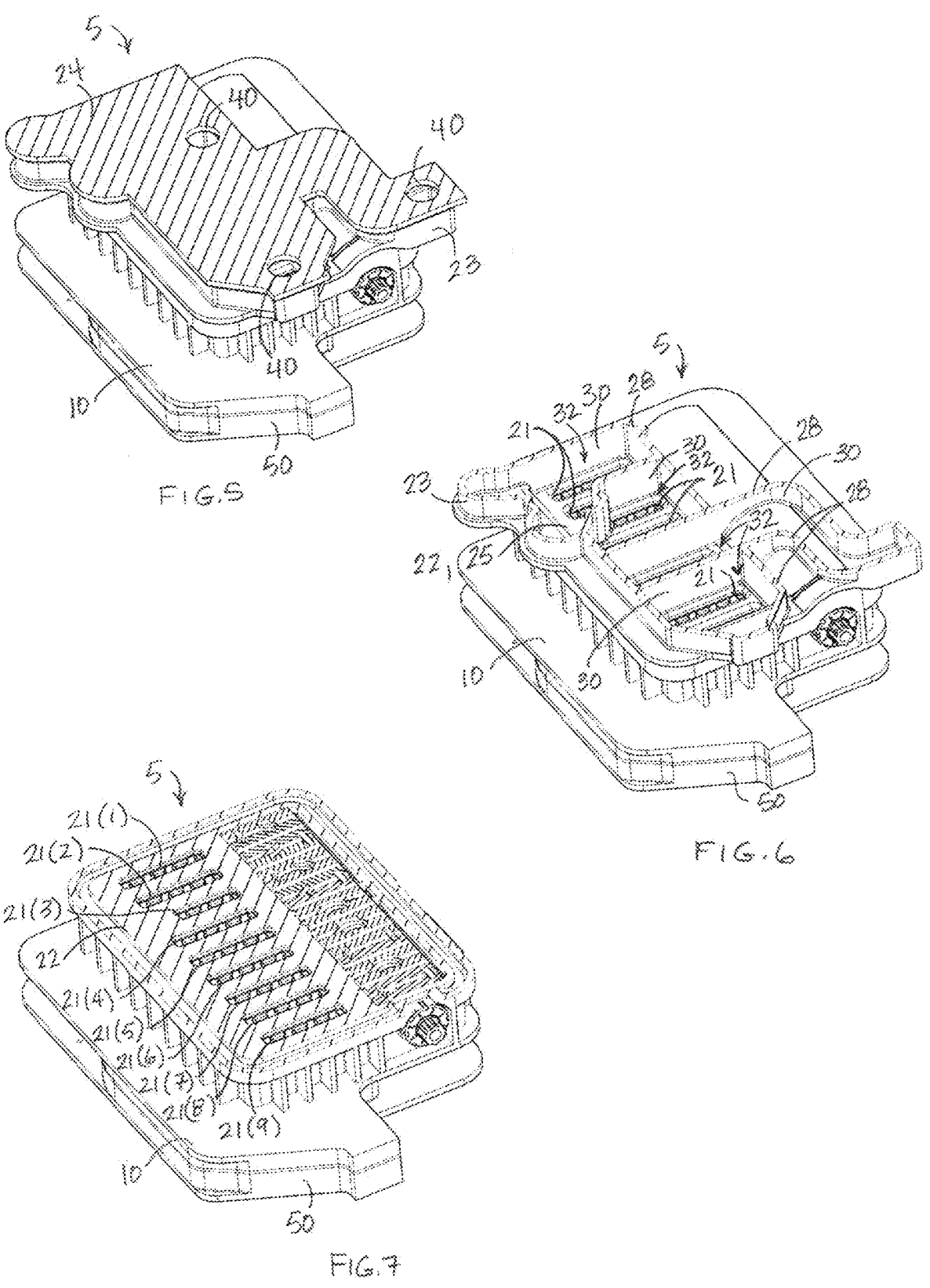
FIG. 5 is a top perspective cross-sectional view of the cam-driven fluid valve assembly as seen along a line passing through the first manifold cover illustrating the first circuit ports.
FIG. 6 is a top perspective cross-sectional view of the cam-driven fluid valve assembly as seen along a line passing through the first manifold.
FIG. 7 is a top perspective cross-sectional view of the cam-driven fluid valve assembly as seen along a line passing through the first manifold plate.

The first manifold 20 has first fluid passageways 30 that provide a fluid connection between first circuit ports 40 (FIG. 5) and first valve ports 21 (FIG. 6). The first circuit ports 40 provide a connection between the coolant circuit and the first fluid passageways 30 of the first manifold 20. The first valve ports 21 provide a connection between the first fluid passageways 30 and fluid valves 120 of the valve assembly 5.

Figures 3, 4:
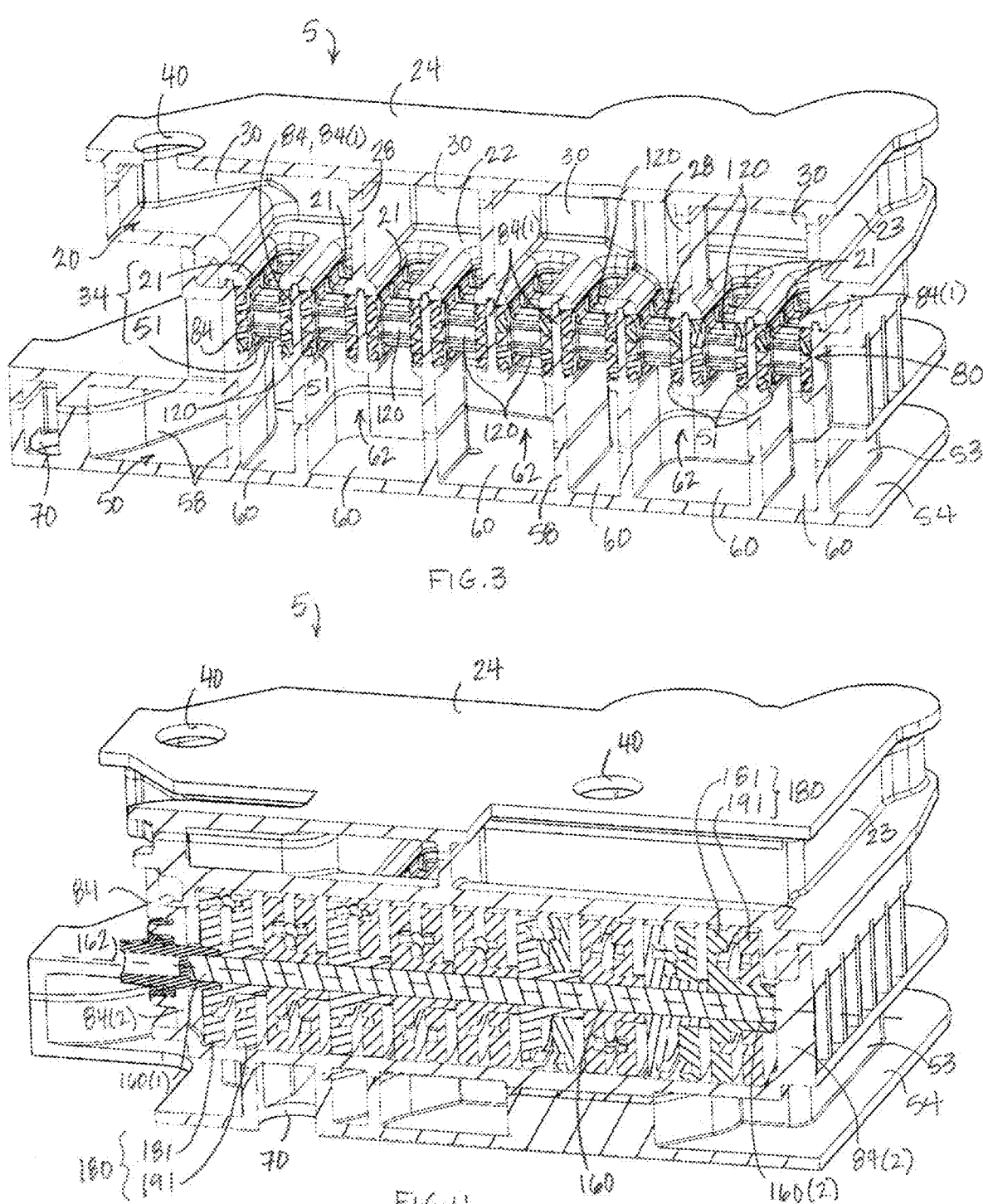
FIG. 3 is a perspective cross-sectional view of the cam-driven fluid valve assembly as seen along line 3-3 of FIG. 1.
FIG. 4 is a perspective cross-sectional view of the cam-driven fluid valve assembly as seen along line 4-4 of FIG. 1.
Figures 8, 9, 10:
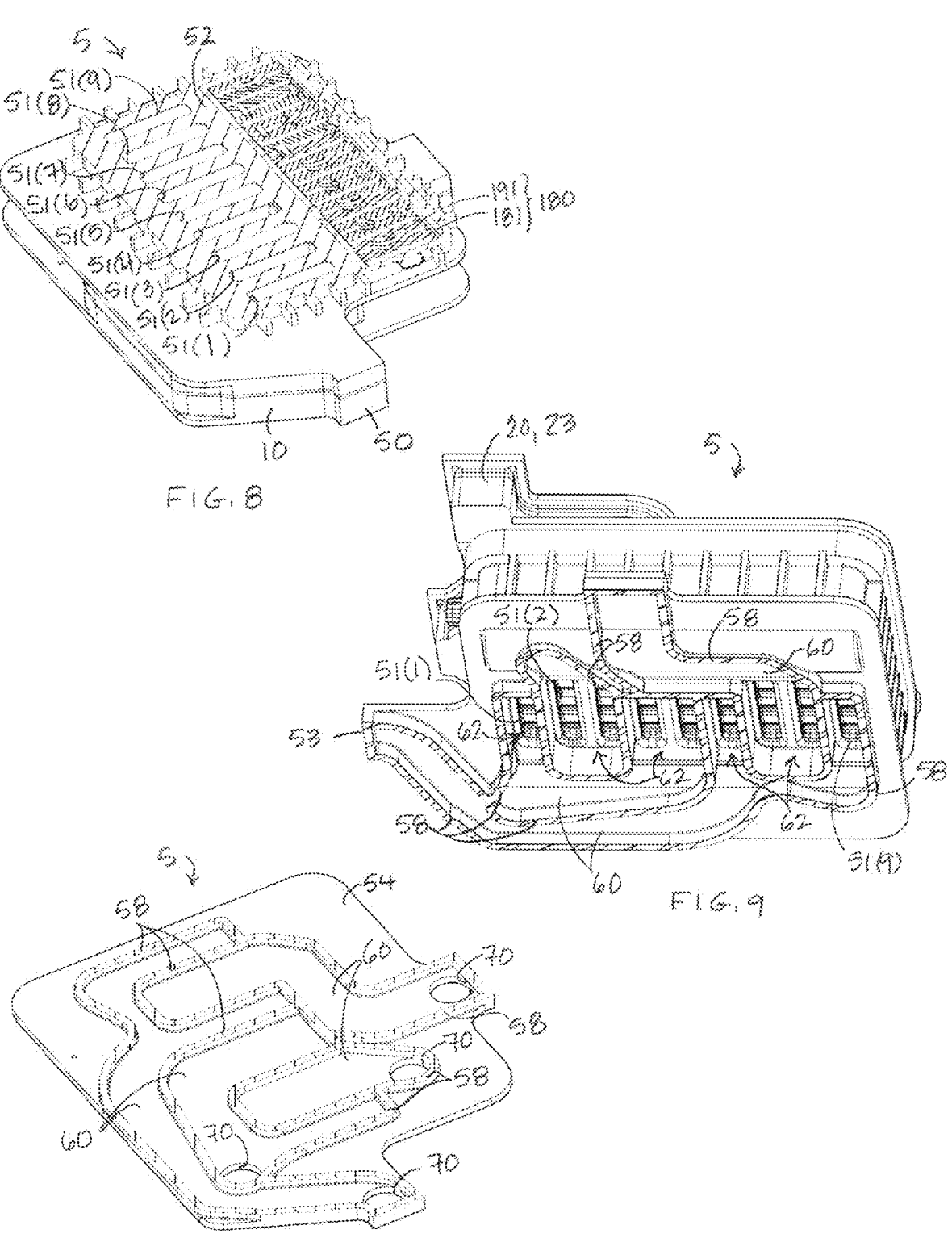
FIG. 8 is a top perspective cross-sectional view of the cam-driven fluid valve assembly as seen along a line passing through the second manifold plate.
FIG. 9 is a bottom perspective cross-sectional view of the cam-driven fluid valve assembly as seen along a line passing through the second manifold.
FIG. 10 is a top perspective cross-sectional view of the cam-driven fluid valve assembly as seen along a line passing through the second manifold illustrating the second circuit ports.

Similarly, the second manifold 50 has second fluid passageways 60 that provide a fluid connection between second circuit ports 70 (FIG. 10) and second valve ports 51 (FIGS. 8 and 9). The second circuit ports 70 provide a connection between the coolant circuit and the second fluid passageways 60 of the second manifold 50. The second valve ports 51 provide a connection between the second fluid passageways 60 and fluid valves 120 of the valve assembly 5. Each second valve port 51 is aligned with a corresponding one of the first valve ports 21 to form a port pair 34 (FIG. 3).

The valve assembly housing 10 includes the valve chamber 80 that is disposed between the first manifold 20 and the second manifold 50. In addition, the valve assembly 5 includes fluid valves 120 and the cam drive assembly 158. The cam drive assembly 158 includes the cam shaft 160 and the cams 180 that are fixed to the cam shaft 160. Each cam 180 is configured to individually activate a respective fluid valve 120. The fluid valves 120 and cam shaft 160 are disposed in the valve chamber 80 and cooperate to control fluid flow between the first and second valve ports 21, 51 of each port pair 34.

In the illustrated embodiment, actuation of the cam shaft 160 permits each cam 180 to move a valve body of a corresponding fluid valve 120, whereby the timing, sequencing and pattern of fluid flow through the assembly housing 10, and also the coolant circuit, can be precisely controlled. In addition, the first and second manifolds 20, 50 of the valve assembly 5 each provide a large number of valve ports 21(1), 21(2), 21(3) . . . 21(n) and 51(1), 51(2), 51(3) . . . 51(n) in a compact package, accommodating a complex fluid circuit and allowing for multiple modes of fluid delivery. The variable n is an integer greater than zero. The value of n is determined by the requirements of the specific application. For example, in the illustrated embodiment, the number n of first valve ports 21, second valve ports 51 and valve port pairs 34 is nine. The cam-driven fluid valve assembly 5 will now be described in detail.

The first manifold 20 includes a first manifold plate 22 that adjoins and is surrounded by a first manifold housing 23. The first manifold housing 23 is closed at one end by the first manifold plate 22. An opposed end of the first manifold housing 23 may be closed by a first manifold cover 24. In some embodiments, the first manifold cover 24 may be an internal portion of the assembly housing 10 that is common with a portion of a module. The first manifold cover 24 includes the first circuit ports 40 that permit fluid flow from the first fluid passageways 30 to other components of the fluid circuit. The first manifold cover 24 overlies the first manifold plate 22, and an interior space of the first manifold 20 is defined between the first manifold plate 22, the first manifold cover 24 and the first manifold housing 23.

The first manifold plate 22 has a first plate inner side 25 that faces toward the second manifold 50 and is common with the valve chamber 80. In addition, the first manifold plate 22 has a first plate outer side 26 that faces away from the valve chamber 80 and the second manifold 50.

The first manifold plate 22 includes multiple first valve ports 21(1), 21(2), 21(3) . . . 21(n) which are through holes that extend from the first plate inner side 25 to the first plate outer side 26.

The first manifold 20 includes first plate partitions 28 (FIG. 6) that extend between the first plate outer side 26 and the first manifold cover 24. The first plate partitions 28 segregate the first valve ports 21 into a plurality of first valve port groups 32. Each first valve port group 32 includes at least one first valve port 21. The first plate partitions 28 may be arranged so that some first valve port groups 32 include a plurality of first valve ports 21. The arrangement of the first valve port groups 32 is determined by the requirements of the specific application. In addition, at locations between the first valve ports 21 and the first manifold housing 23, the first plate partitions 28 may segregate the interior space of the first manifold 20 into the first fluid passageways 30 that connect, and permit fluid communication between, a first valve port group 32 and, for example, one or more of the first circuit ports 40 that provide a connection to fluid lines of the coolant circuit.

The second manifold 50 includes a second manifold plate 52 that adjoins and is surrounded by a second manifold housing 53. The second manifold housing 53 is closed at one end by the second manifold plate 52. An opposed end of the second manifold housing 53 is closed by a second manifold cover 54. In some embodiments, the second manifold cover 54 may be an external portion of the assembly housing 10 that is common with a portion of the module. The second manifold cover 54 includes the second circuit ports 70 that permit fluid flow from the second fluid passageways 60 to other components of the coolant system. The second manifold cover 54 underlies the second manifold plate 52, and an interior space of the second manifold 50 is defined between the second manifold plate 52, the second manifold cover 54 and the second manifold housing 53.

The second manifold plate 52 is parallel to or substantially parallel to the first manifold plate 22. As used here, the term "substantially" refers to within two degrees to four degrees from parallel and is used to account for variations that may normally occur during manufacturing and/or assembly. The second manifold plate 52 has a second plate inner side 55 that faces toward the first manifold 20 and is common with the valve chamber 80. In addition, the second manifold plate 52 has a second plate outer side 56 that faces away from the valve chamber 80 and the first manifold 20.

The second manifold plate 52 includes multiple second valve ports 51(1), 51(2), 51(3) . . . 51(n) which are through holes that extend from the second plate inner side 55 to the second plate outer side 56. The number of second valve ports 51 corresponds to the number of first valve ports 21, so in the illustrated embodiment, the number n of second valve ports 51 equals 9.

Each second valve port 51 is aligned with a corresponding one of the first valve ports 21 in a direction parallel to a port pair axis 36 to form the respective port pairs 34, where the port pair axis 36 is perpendicular to each of the first manifold plate 22 and the second manifold plate 52. In other words, each second valve port 51(1), 51(2), 51(3) . . . 51(n) is paired with a corresponding one of the first valve ports 21(1), 21(2), 21(3) . . . 21(n) to form a respective port pair 34(1), 34(2), 34(3) . . . 34(n), where the valve ports 21, 51 that provide the port pair 34 are aligned in a direction parallel to the port pair axis 36.

The second manifold 50 includes second plate partitions 58 (FIGS. 9 and 10) that extend between the second plate outer side 56 and the second manifold cover 54. The second plate partitions 58 segregate the second valve ports 51 into a plurality of second valve port groups 62. Each second valve port group 62 includes at least one second valve port 51. The second plate partitions 58 may be arranged so that some second valve port groups 62 include a plurality of second valve ports 51. The arrangement of the second valve port groups 62 is determined by the requirements of the specific application. In addition, at locations between the second valve ports 51 and the second manifold housing 53, the second plate partitions 58 may segregate the interior space of the second manifold 50 into the second fluid passageways 60 that connect, and permit fluid communication between, a second valve port group 62 and, for example, one or more of the second circuit ports 70 that provide a connection to fluid lines of the coolant circuit.

Referring to FIGS. 2-4 and 11-12, the valve chamber 80 is disposed between and adjoins the first manifold 20 and the second manifold 50. The valve chamber 80 is in fluid communication with the first manifold 20 via the first valve ports 21 and is in fluid communication with the second manifold 50 via the second valve ports 51. The valve chamber 80 includes wall portions 84 that extend between the first plate inner side 25 and the second plate inner side 55. The wall portions 84 segregate the valve chamber 80 into a first lateral region 85 and a second lateral region 86 that are arranged side-by-side. The first lateral region 85 serves as a fluid valve bank and is configured to support an array of fluid valves 120. The second lateral region 86 adjoins the first lateral region 85 and is configured to rotatably support the cam shaft 160.

The wall portions 84(1) in the first lateral region 85 surround the first valve port 21 and the second valve port 51 of each port pair 34 and segregate the valve chamber 80 into cells 82 in such a way that each cell 82 is separated from adjacent cells 82. Each cell 82 is shaped and dimensioned to receive and support a single fluid valve 120 therein as discussed in more detail below. In addition, each cell 82 and the fluid valve 120 disposed therein is aligned with one of the port pairs 34, and each fluid valve 120 is configured to control fluid flow between the first valve port 21 and the second valve port 51 of a respective port pair 34.

The wall portions 84(1) in the first lateral region 85 define a one-by-i array of cells 82. As used herein, the variable i represents the number of cells 82 and is an integer greater than zero. In the illustrated embodiment, i is nine.

Referring to FIGS. 11-16, in the illustrated embodiment, the fluid valves 120 are sliding gate valves. Actuation of the cam shaft 160 permits each cam 180 to move a movable plate 141 of a corresponding fluid valve 120. In the valve assembly 5, a sliding gate fluid valve 120 is disposed in each of the cells 82 and is configured to control fluid flow between the first valve port 21 and the second valve port 51 of the respective port pair 34. Each sliding gate fluid valve 120 includes a first stationary plate 121, a second stationary plate 131 and a movable plate 141 disposed between the first stationary plate 121 and the second stationary plate 131 in a stacked or layered configuration. The sliding gate fluid valve 120 will now be described in detail.

Although assembled in the sliding gate fluid valve 120 in opposite orientations, the first stationary plate 121 and the second stationary plate 131 are identical in shape and dimension. For this reason, common elements are referred to with common reference numbers and only the first stationary plate 121 will be described in detail.

The first stationary plate 121 is a rigid, rectangular plate having a length dimension $L_S$ that is greater than its width dimension $W_S$, and a width dimension $W_S$ that is greater than its thickness $T_S$ (e.g., height) dimension. For example, in the illustrated embodiment, the length dimension $L_S$ is at least three times the width dimension $W_S$, and the width dimension $W_S$ is at least five times the thickness dimension $T_S$.

The first stationary plate 121 has a first working surface 123 that faces the respective port, and a second working surface 124 that is opposed to the first working surface 123 and faces the movable plate 141. In the case of the first stationary plate 121, the first working surface 123 faces the first valve port 21, whereas in the case of the second stationary plate 131, the first working surface 123 faces the second valve port 51. The first and second working surfaces 123, 124 are parallel to each other and are spaced apart a distance corresponding to the thickness $T_S$ of the first stationary plate 121.

The first stationary plate 121 has at least one first plate through-opening 122 that extends between the first working surface 123 and the second working surface 124. In the illustrated embodiment, the first stationary plate 121 has four first plate through-openings 122 that are spaced apart along the length dimension $L_S$ of the first stationary plate 121. Each first plate through opening 122 has a rectangular profile when viewed facing the first working surface 123 but is not limited to having a profile of this shape.

The first stationary plate 121 includes an outer annular ridge 125 that protrudes from the first working surface 123 and encircles all the first plate through openings 122. In the case of the first stationary plate 121, outer annular ridge 125 locates a first valve seal 100 with respect to the first working surface 123 of the first stationary plate 121. The first valve seal 100 provides a fluid-tight seal between the first stationary plate 121 (e.g., the sliding gate fluid valve 120) and the first manifold 20. In the case of the second stationary plate 131, the outer annular ridge 125 locates a second valve seal 102 with respect to the first working surface 123 of the second stationary plate 131. The second valve seal 102 provides a fluid-tight seal between the second stationary plate 131 (e.g., the sliding gate fluid valve 120) and the second manifold 50.

The first stationary plate 121 includes inner annular ridges 126 that protrude from the second working surface 124. An inner annular ridge 126 encircles each first plate through opening 122. Thus, in the illustrated embodiment, the first stationary plate 121 includes four inner annular ridges 126. The terminal end 126(1) of each inner annular ridge is planar and abuts the movable plate 141. In the case of the first stationary plate 121, the planar terminal end 126(1) forms a fluid tight seal between the first stationary plate 121 and the movable plate 141. In the case of the second stationary plate 131, the planar terminal end 126(1) forms a fluid tight seal between the second stationary plate 131 and the movable plate 141. By this configuration, the inner annular ridges 126 reduce sliding friction between the (fixed) first and second stationary plates 121, 131 and the movable plate 141 during valve operation as compared to a stationary plate having no inner annular ridges.

Each first and second stationary plate 121, 131 of a given fluid valve 120 is disposed in a corresponding cell 82, and each first and second stationary plate 121, 131 is fixed relative to the wall portions 84(1) that define the cell 82. To this end, the wall portions 84(1) that provide each cell 82 are shaped and dimensioned so that each first and second stationary plate 121, 131 is stationary within the cell 82. For example, the wall portions 84(1) define a rectangular opening that receives the first stationary plate 121 therein in a clearance fit (e.g., each cell 82 is formed to closely follow the contours and dimensions of the first stationary plate 121 disposed therein).

The movable plate 141 is a rigid, generally rectangular plate having a length dimension $L_M$ that is greater than its width dimension $W_M$, and a width dimension $W_M$ that is greater than its thickness $T_M$ (e.g., height) dimension. For example, in the illustrated embodiment, the length dimension $L_M$ is at least three times the width dimension $W_M$, and the width dimension $W_M$ is at least five times the thickness dimension $T_M$. The overall dimensions $L_M$, $W_M$, $T_M$ of the movable plate are substantially the same as the overall dimensions $L_S$, $W_S$, $T_S$ of the first and second stationary plates 121, 131.

The movable plate 141 has a first working surface 143 that faces the respective first stationary plate 121, and a second working surface 144 that is opposed to the first working surface 143 and faces the second stationary plate 151. The first and second working surfaces 143, 144 are parallel to each other and are spaced apart a distance corresponding to the thickness $T_M$ of the movable plate 141. In addition, the first and second working surfaces 143, 144 are planar (e.g., lie in a plane) and substantially smooth.

The movable plate 141 has a peripheral surface 145 that extends between the first and second working surfaces 143, 144. The peripheral surface 145 includes a first end surface 145(1) that faces the cam shaft 160, a second end surface 145(2) that is opposite the first end surface 145(1), and a pair side surfaces 145(3), 145(4) that extend in the length direction between the first end surface 145(1) and the second end surface 145(2).

The width of the movable plate 141 is non-uniform. In particular, the width of a central portion of the movable plate 141 is greater than the width of the movable plate 141 at each of the first and second end surfaces 145(1), 145(2). Shoulders 145(6) are formed at the transitions between widths. The shoulders 145(6) are much closer to the respective the first and second end surfaces 145(1), 145(2) than to a mid-length of the movable plate 141. As seen when the movable plate 141 is viewed in top plan view (e.g., in a direction facing the first working surface 143), the central portion of the movable plate 141 is rectangular and has a width $W_M$ that corresponds to the width $W_S$ of the stationary plates 121, 131.

The second end surface 145(2) includes a leg 146 that protrudes outward toward the cam shaft 160. A proximal end of the leg 146 is integral with the movable plate second end surface 145(2). A distal end 147 of the leg 146 is opposite the proximal end and is enlarged relative to the proximal end. The leg distal end 147 includes a through opening 149 that receives a cam follower. In the illustrated embodiment, the cam follower is a pin 154 that is fixed in the opening 149. Ends 156 of the pin 154 protrude from opposed sides of the leg distal end 147 and engage with an internal cam track 200 of the cam 180.

The central portion of the movable plate 141 has at least one movable plate through-opening 142 that extends between the first working surface 143 and the second working surface 144. In the illustrated embodiment, the movable plate 141 has four movable plate through-openings 142 that are spaced apart along the length dimension $L_M$ of the movable plate 141. Each movable plate through opening 142 has a profile shape when viewed facing the first working surface 143 that is the same as that of the first plate through-opening 122. Thus, in the illustrated embodiment, the movable plate through-openings 142 have a profile that is rectangular.

Figure 11:
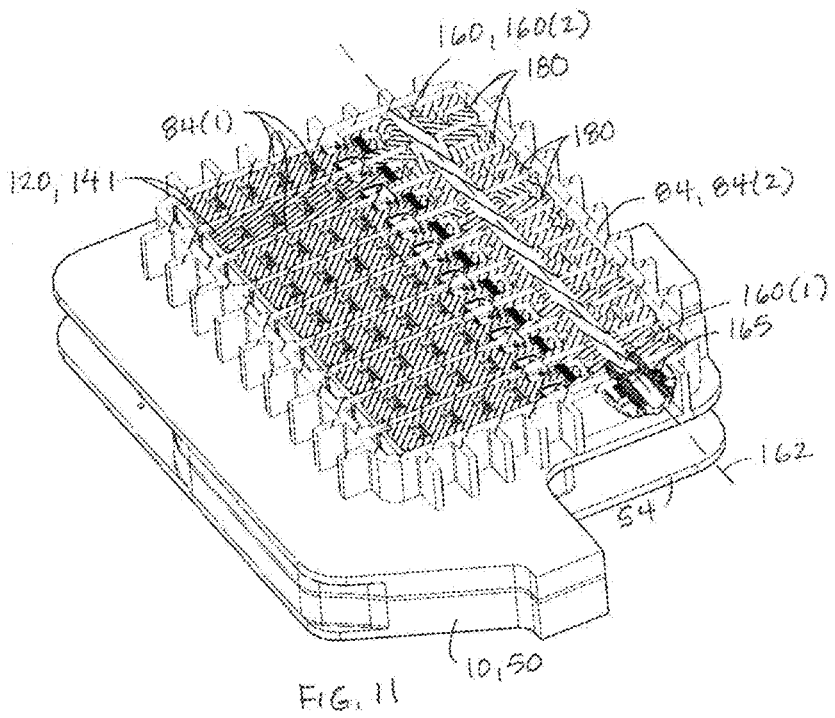
FIG. 11 is a top perspective cross-sectional view of the cam-driven fluid valve assembly as seen along a line passing through the movable plates of the sliding gate valves.
Figure 12:
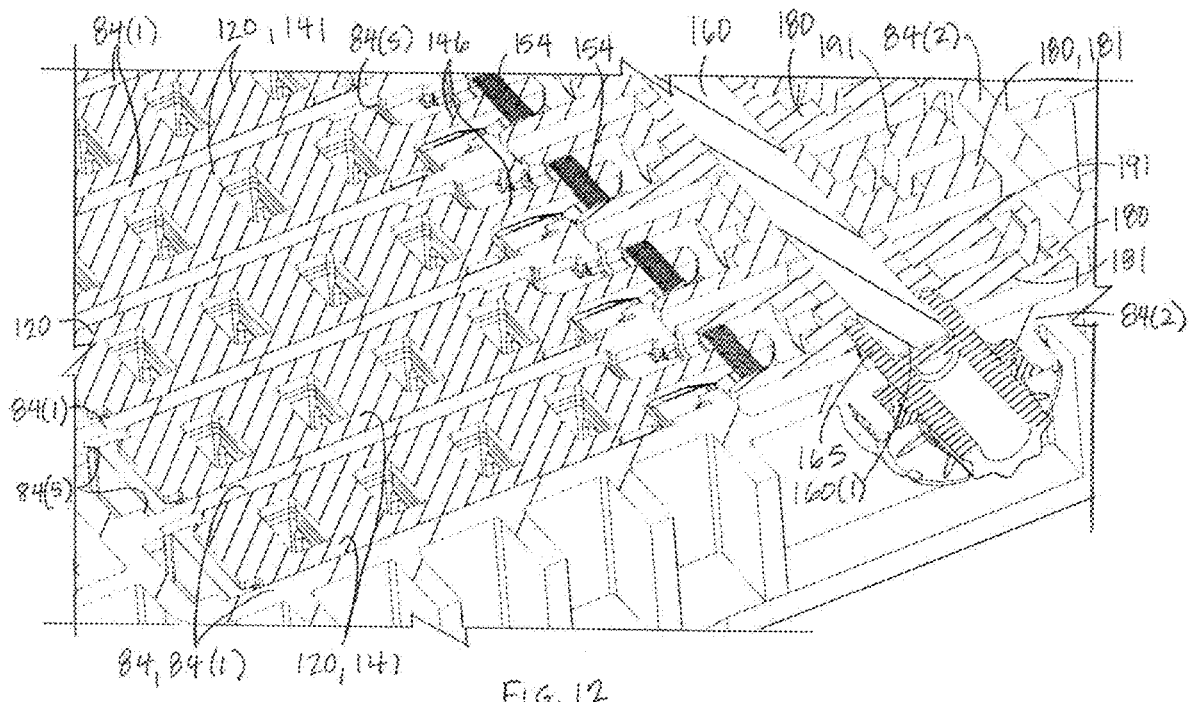
FIG. 12 is an enlarged view of a portion of the cross-sectional view of FIG. 11.
Figure 13:
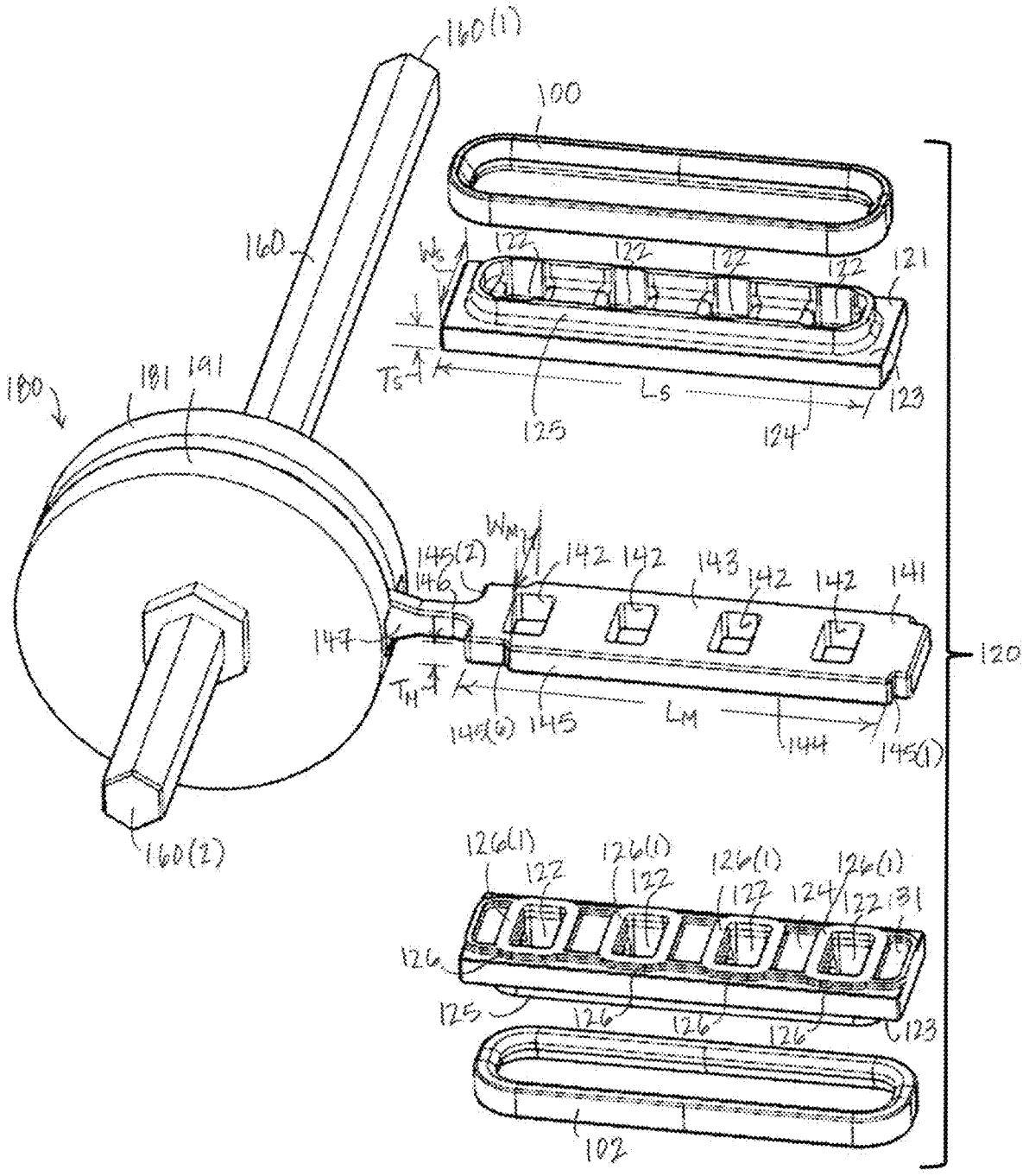
FIG. 13 is a top perspective view of a subassembly including the cam shaft, an isolated cam supported on the cam shaft and the corresponding sliding gate fluid valve, with the fluid valve shown as exploded.
Figure 14:
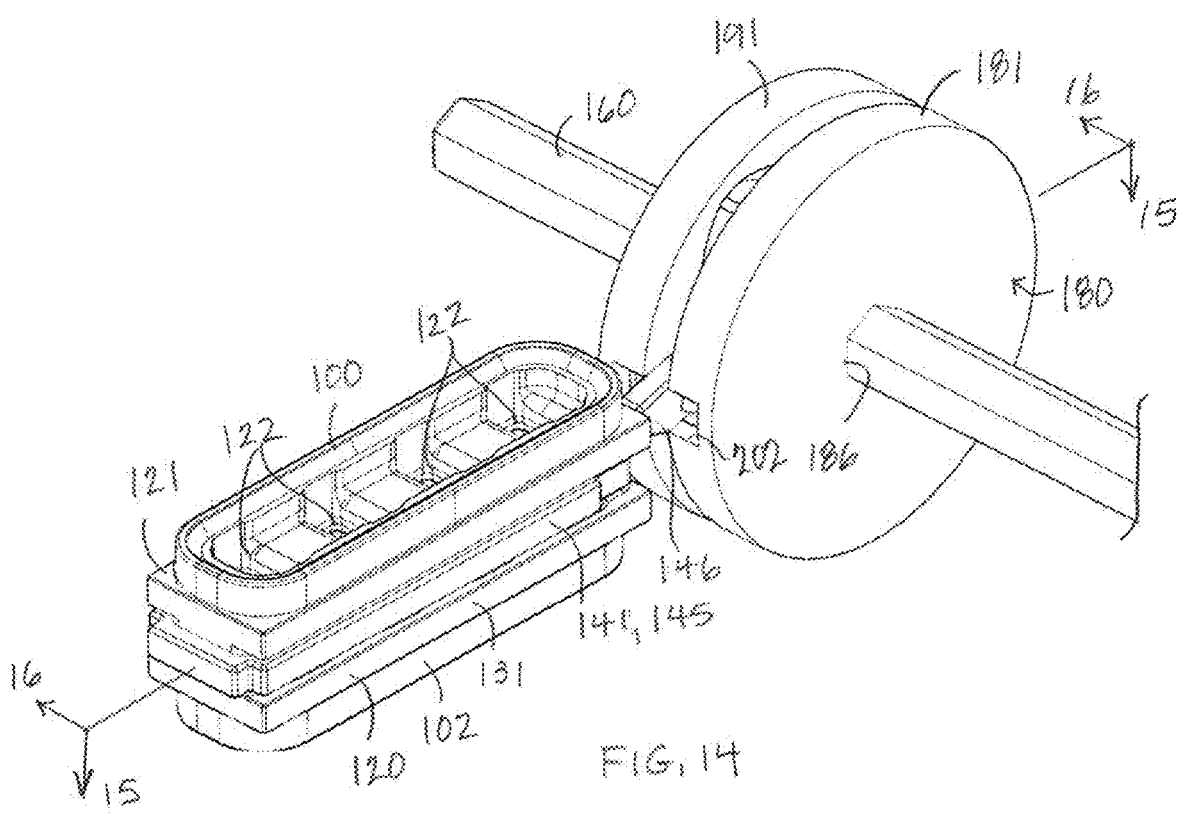
FIG. 14 is another top perspective view of the subassembly of FIG. 13 with the fluid valve shown normally.
Figure 15:
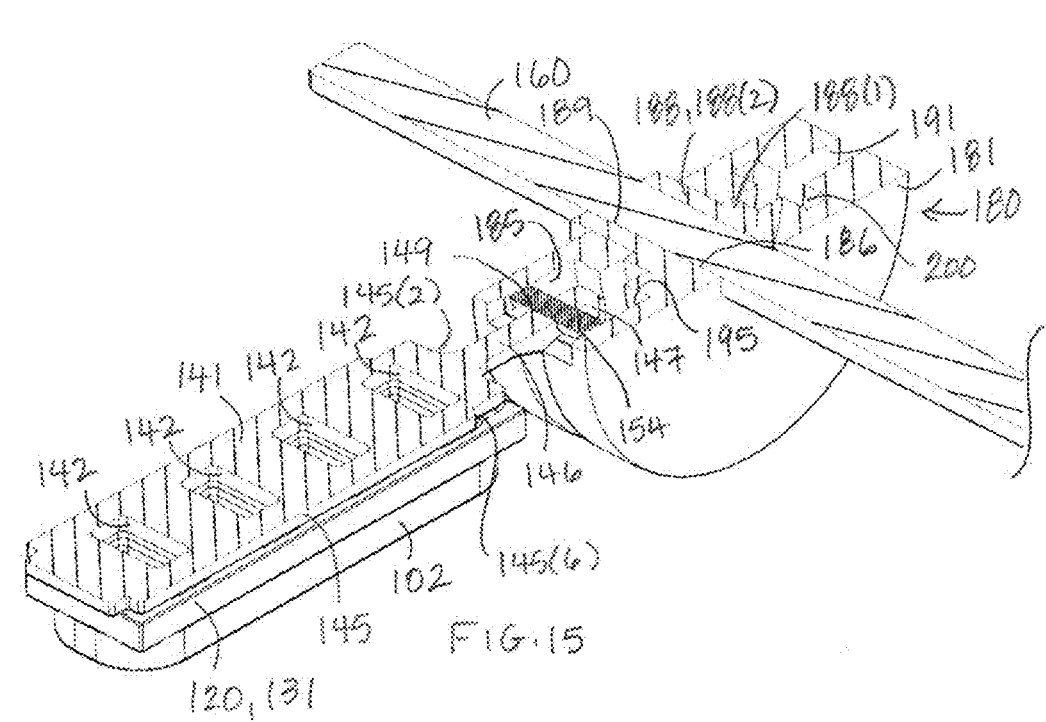
FIG. 15 is a cross-sectional view of the fluid valve of FIG. 13 as seen along line 15-15 of FIG. 14.

The movable plate 141 is moveable relative to the first and second stationary plates 121, 131 within a plane 150 (shown in FIG. 17) that is parallel to the first stationary plate 121. To this end, in the vicinity of the movable plate 141, the wall portions 84(1) that provide each cell 82 have substantially the same shape as the movable plate 141 (FIG. 12). FIGS. 11 and 12 illustrate the valve assembly 5 as seen in a cross-sectional view taken through the plane 150. In particular, these figures show the movable plate 141 of each fluid valve 120 surrounded by the wall portions 84(1). Although the wall portions 84(1) have the same width dimension as the width dimension $W_M$ of the movable plate 141, the wall portions 84(1) define an opening that is longer than the length dimension $L_M$ to permit movement of the movable plate 141 within the plane 150 in a radial direction of the cam shaft 160. Because the wall portions 84(1) in the vicinity of the movable plate 141 have substantially the same shape as the movable plate 141, the wall portions 84(1)

define internal shoulders 84(s) that serve as stops to limit the extent of translation of the moveable plate 141 within the cell 82.

Within each cell 82, the first stationary plate 121 is fixed relative to the wall portions 84(1) so as to face the corresponding first valve port 21. Similarly, the second stationary plate 131 is fixed relative to the wall portions 84(1) so as to face the corresponding second valve port 51 and such that the second plate through openings 122 are aligned with the first plate through-openings 122 in a direction that is parallel to the port pair axis 36 and perpendicular to the plane 150. The movable plate 141 is disposed in the cell 82 between the first stationary plate 121 and the second stationary plate 131 and is moveable relative to the first and second stationary plates 121, 131 within the plane 150. In particular, the movable plate 141 is constrained by the wall portions 84(1) and the stationary plates 121, 131 to move within the plane 150 in a direction that is parallel to the length dimension $L_M$. In the illustrated embodiment, the rotational axis 162 of the cam shaft 160 resides in the plane 150 and the movement direction corresponds to a radius of the cam shaft 160.

The valve assembly 5 includes a cam shaft 160 that extends into the valve chamber 80. In the illustrated embodiment, the cam shaft 160 is a rigid rod having a hexagonal cross-sectional shape. The cam shaft 160 is supported for rotation by the assembly housing 10. More specifically, the cam shaft 160 is disposed in the second lateral region 86 of the valve chamber 80. The first end 160(1) of the cam shaft 160 is supported for rotation by a bearing 165, which in turn is supported by the wall portion 84(2) in the second lateral region 86. The first end 160(1) of the cam shaft 160 protrudes through the valve assembly housing 10 in a sealed manner and is connected to an actuator (not shown). The actuator drives the cam shaft 160 to rotate about the cam shaft rotational axis 162 which extends in parallel to the first and second manifold plates 22, 52. The second end 160(2) of the cam shaft 160 resides within the second lateral region 86.

Referring to FIGS. 15-20, the valve assembly 5 includes cams 180 that are supported on, and rotate in concert with, the cam shaft 160. The cams 180 are arranged on the cam shaft 160 so that each cam 180 is aligned with a unique one of the cells 82, and thus also with a unique one of the fluid valves 120. Each fluid valve 120 is actuated by the respective aligned cam 180. By this configuration, the cams 180 are spaced apart long the cam shaft 160 in a direction parallel to the cam shaft rotational axis 162.

Each cam 180 is an assembly of a first cam disc 181 and a second cam disc 191. As used herein, the term "disc" refers to a cylindrical structure having a diameter that is greater than its height. For example, in the illustrated embodiment, the diameter is at least five times the height. In other embodiments, the diameter may be seven times the height or more. The first and second cam discs 181, 191 each have the same diameter and the same height.

The first cam disc 181 includes a first cam inner surface 183 that faces the second cam disc 191, a first cam outer surface 182 that is parallel to the first cam inner surface 183 and faces away from the second cam disc 191. The first cam disc 181 includes a first cam peripheral surface 184 having a circular profile and that extends between the first cam inner surface 183 and the first cam outer surface 182.

The first cam disc 181 includes a centrally-located first cam through opening 186 that extends between the first cam inner surface 183 and the first cam outer surface 182 and receives the cam shaft 160 therethrough. The first cam through opening 186 is shaped and dimensioned to be press fit onto the cam shaft 160. In the illustrated embodiment, the first cam through opening 186 has a hexagonal shape to correspond to the cross-sectional shape of the cam shaft 160.

The first cam disc 181 includes a collar 188 that protrudes from the first cam inner surface 183 and is centered on the first cam inner surface 183. The collar 188 surrounds the first cam through opening 186 and an inner surface 189 of the collar 188 has the same cross-sectional shape and dimensions as the first cam through opening 186, whereby the collar inner surface 189 and the inner surface of the first cam through opening 186 define a continuous hexagonal bearing surface that engages the cam shaft outer surface.

The collar 188 includes a proximal portion 188(1) that adjoins the first cam inner surface 183 and a distal portion 188(2) that is spaced apart from the first cam inner surface 183. An outer surface of the collar proximal portion 188(1) has a circular cross-sectional shape and serves as a spacer that maintains a desired spacing between the first and second cam discs 181, 191 when the first and second cam discs 181, 191 are assembled to form the cam 180. An outer surface of the collar distal portion 188(2) is shaped and dimensioned to be received in a central opening (e.g., the second cam through opening 196) of the second cam disc 191. In the illustrated embodiment the collar distal portion 188(2) is press fit within the second cam through opening 196. In addition, the collar distal portion 188(2) has a hexagonal cross-sectional shape to correspond to the hexagonal cross-sectional shape of the second cam through opening 196. In other words, the collar 188 provides a mechanical connection between the first cam disc 181 and the second cam disc 191 that ensures that the first cam disc 181 is fixed to the second cam disc 191. In addition, the collar 188 ensures that the first and second cam discs 181, 191 are parallel to each other with the first cam disc inner surface 183 facing and spaced apart from an inner surface 193 of the second cam disc 191. Still further, the collar 188 retains the first cam disc 181 in a desired rotational orientation relative to the second cam disc 191.

The first cam inner surface 183 has a first cam groove 185 formed therein. The first cam groove 185 defines an eccentric first path that surrounds at least a portion of the first cam through opening 186 and the collar 188. In the illustrated embodiment, the first cam groove 185 is disposed between the collar 188 and the peripheral surface 184 and completely encircles the collar 188.

The second cam disc 191 includes a second cam inner surface 193 that faces the first cam disc 181, a second cam outer surface 192 that is parallel to the second cam inner surface 193 and faces away from the first cam disc 181. The second cam disc 191 includes a second cam peripheral surface 194 having a circular profile and that extends between the second cam inner surface 193 and the second cam outer surface 192.

The second cam disc 191 includes the centrally-located second cam through opening 196 that extends between the second cam inner surface 193 and the second cam outer surface 192. The second cam through opening 196 receives the collar 188 in a press fit. In the illustrated embodiment, the second cam through opening 196 has a hexagonal shape to correspond to the cross-sectional shape of the outer surface of the collar 188. When the first and second cam discs 181, 191 are assembled, the collar 188 extends through the second cam through opening 196 and the outer surface of the collar 188 forms an interlocking engagement with the surface of the second cam through opening 196.

The second cam inner surface 193 has a second cam groove 195 formed therein. The second cam groove 195 defines an eccentric second path that surrounds at least a portion of the second cam through opening 196. In the illustrated embodiment, the second cam groove 195 is disposed between the collar 188 and the peripheral surface 184 and completely encircles the second cam through opening 196.

The profile of second cam groove 195 is a mirror image of the profile first cam groove 185 when the first and second cam discs 181, 191 are viewed facing their respective inner surfaces 183, 193. As a result, when the first and second discs 181, 191 are assembled to form the cam 180, each point along the second cam groove 195 is axially aligned with a corresponding point of the first cam groove 185. As used herein, the term "axially" is used with reference to the rotational axis 162 of the cam shaft 160. When the first and second discs 181, 191 are assembled to form the cam 180, first cam groove 185 and the second cam groove 195 cooperate to form an eccentric internal track 200 of the cam 180. The cam track 200 of each cam 180 receives and engages with a cam follower 154 of a corresponding sliding gate valve 120.

Each of the first cam groove 185 and the second cam groove 195 (e.g., the cam track 200) defines a continuous inner race 185(1), 195(1) corresponding to a surface of the groove 185, 195 that is parallel to the rotational axis and disposed between the rotational axis and the peripheral surface 184, 194 of the respective cam disc 181, 191. The distance of the inner race 185(1), 195(1) from the rotational axis 162 varies along a circumference of the respective first or second cam disc 181, 191.

In addition, each of the first cam groove 185 and the second cam groove 195 (e.g., the cam track 200) defines an outer race 185(2), 195(2) corresponding to a surface of the groove 185, 195 that is parallel to the rotational axis and disposed between the inner race 185(1), 195(1) and the peripheral surface 184, 194 of the respective cam disc 181, 191. The distance of the outer race 185(2), 195(2) from the inner race 185(1), 195(1) varies in a circumferential direction of the respective first and second cam disc 181, 191. The outer race 185(2), 195(2) is not continuous, and the peripheral surfaces 184, 194 comprise an opening 202 that intersects the outer race 185(2), 195(2) and communicates with the cam track 200. The opening 202 is configured to permit the respective cam follower 154 to enter the cam track 200 for purposes of assembly therewith.

In the illustrated embodiment, the peripheral surfaces 184, 194 of the first and second cam discs 181, 191 have a circular profile and provide bearing surfaces that rotatably support the cam 180 with respect to an inner surface of the assembly housing 10. In other embodiments, the peripheral surfaces 184, 194 of the first and second cam discs 181, 191 may have a non-circular profile.

The movable plate 141 of each of the sliding gate valves 120 is mechanically connected to the corresponding cam 180 in such a way that rotation of the cam 180 results in a corresponding movement of the movable plate 141, and the corresponding movement of the movable plate 141 is independent of a peripheral shape of the cam 180. The movable plate 141 is mechanically connected to the cam track 200 of the corresponding cam 180 via its cam follower, e.g., the pin 154. The movable plate 141 is moveable relative to the first stationary plate 121 of the fluid valve 120 within the plane 150 that is parallel to the first stationary plate 121 upon rotation of the cam 180 about the cam shaft rotational axis 162.

Upon rotation of the cam shaft 160 about the rotational axis 162, the movable plate 141 of each fluid valve 120 is driven by the cam 180 to reciprocate along a movement axis 148 that is perpendicular to the rotational axis 162 and coincides with a radius of the cam shaft 160. In the illustrated embodiment, the movable plate 141 is movable (e.g., reciprocates) between a first position and a second position. In the first position (FIG. 17), the movable plate through-openings 142 are aligned with the through-openings 122 of the first and the second stationary plates 121, 131 and fluid is permitted to flow through the sliding gate fluid valve 120 between the first valve port 21 and the second valve port 51. In the second position (FIG. 18), the movable plate through-openings 142 are not aligned with the through-openings 122 of the first and the second stationary plates 121, 131 and fluid is prevented from flowing through the sliding gate fluid valve 120 between the first valve port 21 and the second valve port 51. Since no overlap exists between the movable plate through-openings 142 and the stationary plate through-openings 122 fluid flow through the fluid valve 120 is prevented when the movable plate 141 is in the second position.

Figures 16, 17, 18:
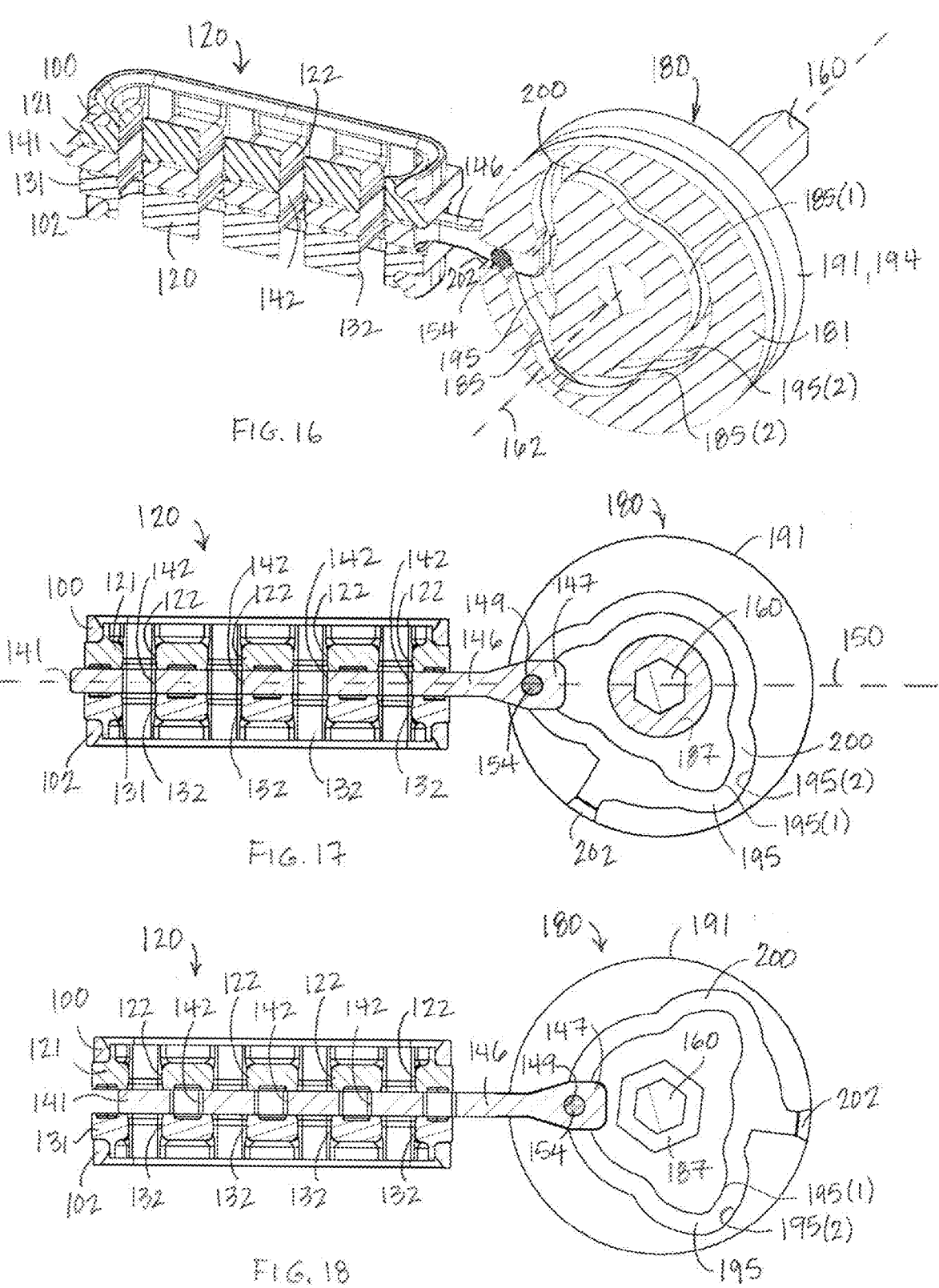
FIG. 16 is a cross-sectional view of the fluid valve of FIG. 13 as seen along line 16-16 of FIG. 14.
FIG. 17 is a cross-sectional view of the fluid valve of FIG. 13 with the cam oriented so that the fluid valve is in the first position in which fluid is permitted to flow through the fluid valve.
FIG. 18 is a cross-sectional view of the fluid valve of FIG. 13 with the cam oriented so that the fluid valve is in the second position in which fluid is prevented from flowing through the fluid valve.
Figure 19:
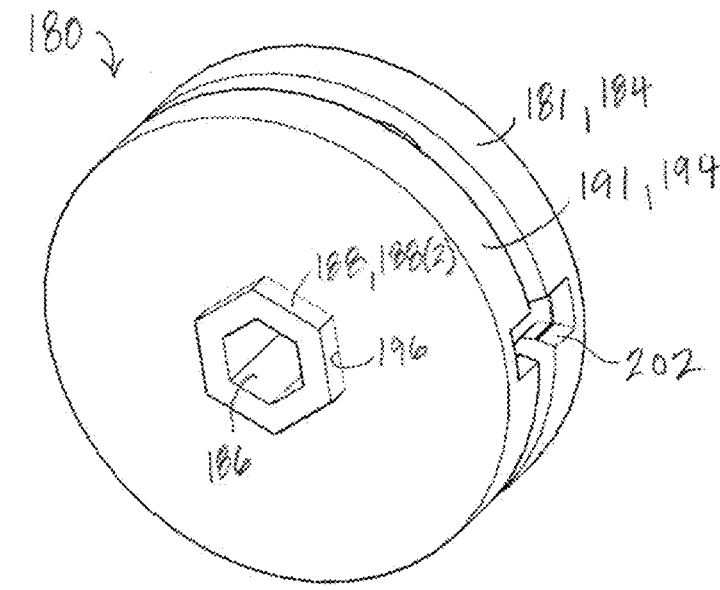
FIG. 19 is a perspective view of a single cam in isolation.
Figure 20:
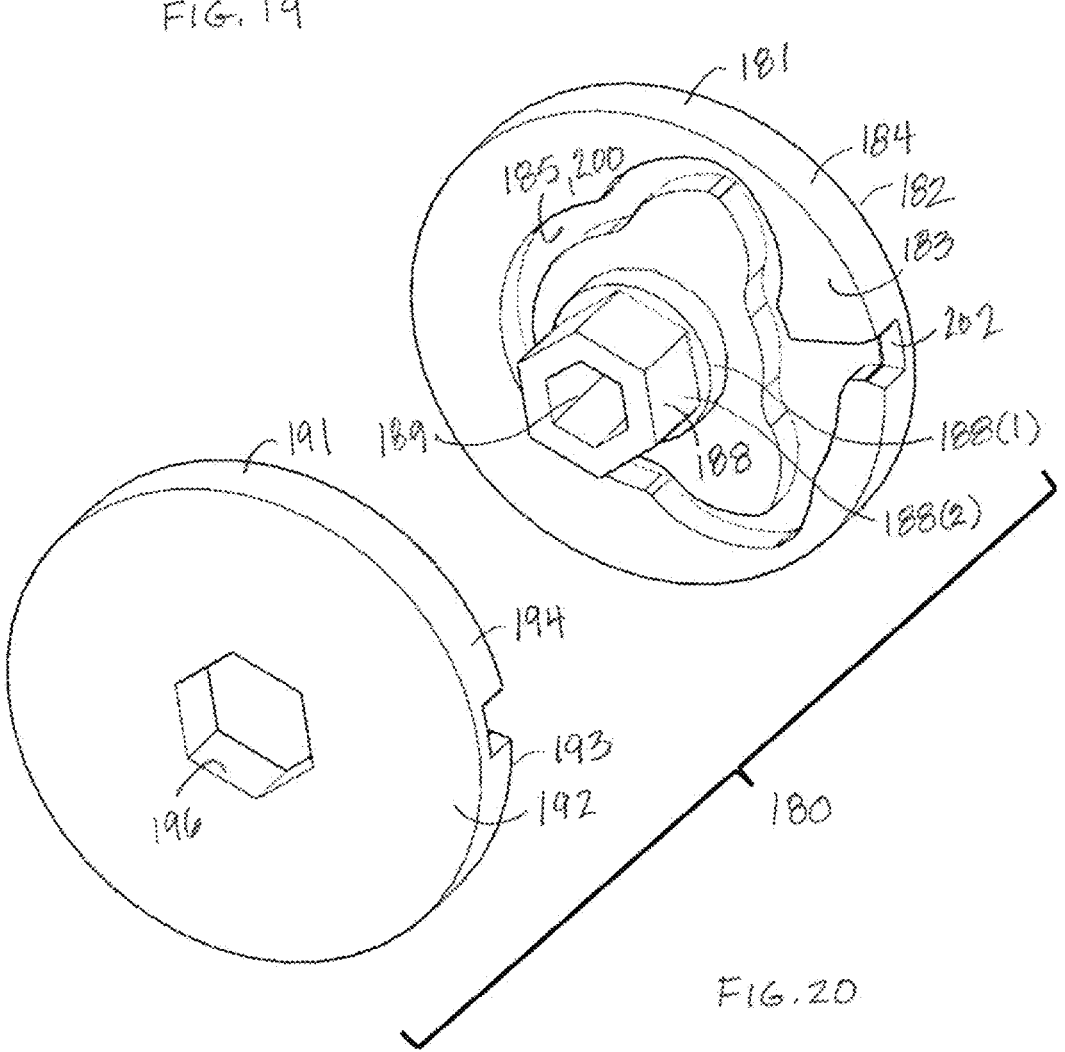
FIG. 20 is an exploded perspective view of the cam of FIG. 19.

This effect is achieved by varying the distance of the first and second cam grooves 185, 195 (e.g., varying the distance of the cam track 200) from the rotational axis 162 in a circumferential direction of the first and second cam discs 181, 191. When the distance of the cam track 200 from the rotational axis 162 is at a minimum, the movable plate 141 is in the second position (FIG. 18), and when the distance of the cam track 200 from the rotational axis 162 is at a maximum, the movable plate 141 is in the first position (FIG. 17).

The amount of fluid flow through the fluid valve 120 can be made variable by selectively positioning the movable plate 141 at a location between the first position and the second position.

Each sliding gate fluid valve 120 includes annular valve seals 100, 102 that are disposed between the fluid valve 120 and the first and second manifolds 20, 50. In particular, each sliding gate fluid valve 120 includes the first valve seal 100 that is disposed between the first working surface 123 of the first stationary plate 121 and the first manifold 20, providing a fluid tight seal therebetween. The first valve seal 100 surrounds the corresponding first valve port 21 as well as the first stationary plate through openings 122. Each sliding gate fluid valve 120 includes the second valve seal 102 that is disposed between the first working surface 123 of the second stationary plate 131 and the second manifold 50, providing a fluid tight seal therebetween. The second valve seal 102 surrounds the corresponding second valve port 51 as well as the second stationary plate through openings 122.

Each of the first valve seals 100 and the second valve seals 102 may be formed of an elastomer that is compatible with automotive coolant, such as ethylene propylene diene mono-mer (EPDM). In the illustrated embodiment, the first and second valve seals 100, 102 have a "U" cross-sectional shape that opens facing the respective manifold 20, 50. In other embodiments, the first and second valve seals 100, 102 may have other cross-sectional shapes, such as, but not limited to, circular, rectangular, oval, "X" or "I" shapes.

As previously described, the valve assembly 5 includes single array of fluid valves 120 disposed in the valve chamber first lateral region 85 and the cam shaft 160 which is disposed in the valve chamber second lateral region 86. Each fluid valve 120 is disposed in a respective cell 82 in the valve chamber 80 in alignment with a port pair 34 such that for certain rotational orientations of the cam shaft 160 relative to the assembly housing 10, at least one cam 180 engages a corresponding one of the fluid valves 120 in such a way that the one of the fluid valves 120 is movable between the first position in which fluid is permitted to flow between the first valve port 21 and the second valve port 51 of the port pair 34, and the second position in which fluid is prevented from flowing between the first valve port 21 and the second valve port 51 of the port pair 34.

Each cell 82 is arranged so that the length dimensions $L_M$ of the valve movable plates 141 extend in a direction perpendicular to the cam shaft rotational axis 162 and so that plane 150 in which the movable plates 141 resides also includes the rotational axis 162. Thus, the movable plates 141 of the sliding gate fluid valves 120 are coplanar (FIG. 11).

Each cam 180 is configured to be mechanically engaged with a corresponding one of the fluid valves 120. The cam shaft 160 includes multiple cams 180, for example nine cams 180 in the illustrated embodiment. Each cell 82 is aligned with a single cam 180 which drives the movable plate 141 disposed in the cell 82.

Actuation of the cam shaft 160 permits each cam 180 to move a valve body, in this embodiment a movable plate 141, of a corresponding fluid valve 120, whereby the timing, sequencing and pattern of fluid flow through a cooling system that includes the valve assembly 5 can be precisely controlled. The cam shaft 160 and cams 180 are arranged to open and close the fluid valves 120 in such a way that, in cooperation with the first fluid passageways 30 of the first manifold 20 or the second fluid passageways 60 of the second manifold 50, multiple ones of the sliding gate fluid valves 120 may allow direction of fluid to a single other sliding gate fluid valve 120 and/or a single one of the sliding gate fluid valves 120 may direct fluid to multiple other ones of the sliding gate fluid valves 120, depending on operating conditions of the system.

In the illustrated embodiment, the fluid valves 120 are sliding gate valves and each fluid valve 120 is driven to move within the plane 150 via rotation of the cams 180, but the cam-driven fluid valve assembly 5 is not limited to being implemented via a sliding gate valve. For example, in other embodiments, the sliding gate valves may be replaced by another type of valve such as lift valves, disk valves, plug valves, etc.

Although the illustrated embodiment shows that each fluid valve 120 is a sliding gate valve, the cam-driven fluid valve assembly 5 is not limited to having only sliding gate valves. For example, in some embodiments, multiple types of valves may be incorporated into the assembly housing 10. In some embodiments, at least one of the fluid valves is a sliding gate valve.

In the illustrated embodiment, the first and second stationary plates 121, 131 have a rectangular profile when viewed in a direction facing the first working surface 123. However, the first and second stationary plates are not limited to having this shape. For example, in some embodiments, the corners of the rectangular profile may be rounded. In other embodiments, the first and second stationary plates 121, 131 may have an oval or irregularly-shaped profile.

In the illustrated embodiment, each cam 180 includes a first cam disc 181 in which the collar inner surface 189 defines a hexagonal opening through which the cam shaft 160 extends. The collar inner surface 189 is shaped and dimensioned to correspond to the shape and dimensions of the cam shaft 160 so that the cam 180 rotates in concert with the cam shaft 160. However, in other embodiments, splines, keys or other known structures may be used to fix the cams 180 relative to the cam shaft 160.

Selective illustrative embodiments of the cam-driven valve system are described above in some detail. It should be understood that only structures considered necessary for clarifying the cam-driven valve system have been described herein. Other conventional structures, and those of ancillary and auxiliary components of the cam-driven valve system, are assumed to be known and understood by those skilled in the art. Moreover, while a working example of the cam-driven valve system have been described above, the cam-driven valve system is not limited to the working example described above, but various design alterations may be carried out without departing from the cam-driven valve system as set forth in the claims.

We claim:

1. A valve assembly comprising:

an assembly housing having ports, each port configured to permit fluid communication between an environment of the assembly housing and an interior space of the assembly housing;

a cam shaft supported on the assembly housing, the cam shaft extending into the interior space and configured to rotate about a rotational axis;

cams that are disposed in the interior space and supported on the cam shaft, each cam configured to rotate in concert with the cam shaft, each cam comprises a first cam disc fixed to a second cam disc, each cam having an internal groove that is defined between surfaces of the first cam disc and the second cam disc and defines a cam track, the cam track at least partially encircling the rotational axis; and valves, each valve associated with a respective one of the cams, each valve including a valve seat having a valve seat through-opening, the valve seat being disposed in the assembly housing and fixed relative to the assembly housing so as to face a first one of the ports, and a valve body that is movable relative to the valve seat, the valve body being disposed in the assembly housing and movable with the assembly housing between a first position in which fluid is permitted to flow through the valve seat through opening, and a second position in which fluid is prevented from flowing through the valve seat through opening, wherein the valve body is mechanically connected to the cam track of the respective one of the cams, the valve body being moveable relative to the valve seat upon rotation of the cam about the cam shaft.

2. The valve assembly of claim 1, wherein the first cam disc includes a first cam inner surface that faces the second cam disc, a first cam outer surface that faces away from the second cam disc, a first cam peripheral surface that extends between the first cam inner surface and the first cam outer surface, a first cam through opening that extends between the first cam inner surface and the first cam outer surface and receives the cam shaft therethrough, and a first cam groove formed in the first cam inner surface, the first cam groove defining a first path that surrounds at least a portion of the first cam through opening, the second cam disc includes a second cam inner surface that faces the first cam disc, a second cam outer surface that faces away from the first cam disc, a second cam peripheral surface that extends between the second cam inner surface and the second cam outer surface, a second cam through opening that extends between the second cam inner surface and the second cam outer surface and receives the cam shaft therethrough, and a second cam groove formed in the second cam inner surface, the second cam groove defining a second path that surrounds at least a portion of the second cam through opening, and the first cam groove and the second cam groove cooperate to form the cam track.

3. The valve assembly of claim 2, wherein the cam track is eccentric.

4. The valve assembly of claim 2, wherein the second cam groove has a profile that corresponds to a mirror image of the profile of the first cam groove.

5. The valve assembly of claim 2, wherein a distance of the first cam groove from the rotational axis varies along a circumference of the first cam disc.

6. The valve assembly of claim 5, wherein when the distance of the first cam groove from the rotational axis is at a minimum, the movable plate is in the second position, and when the distance of the first cam groove from the rotational axis is at a maximum, the movable plate is in the first position.

7. The valve assembly of claim 2, wherein the first cam peripheral surface and the second cam peripheral surface provide bearing surfaces that rotatably support the cam with respect to an inner surface of the assembly housing.

8. The valve assembly of claim 2, wherein the first cam groove defines a first inner race that is parallel to the rotational axis and disposed between the rotational axis and the first cam peripheral surface, the distance of the first inner race from the rotational axis varies along a circumference of the first cam disc, the first cam groove defines a first outer race that is parallel to the rotational axis and disposed between the first inner race and the first cam peripheral surface, and the distance of the first outer race from the first inner race varies along a circumference of the first cam disc.

9. The valve assembly of claim 1, wherein the first cam disc and the second cam disc are mechanically joined together by a collar that maintains a gap between the first cam disc and the second cam disc.

10. The valve assembly of claim 1, wherein the first cam disc and the second cam disc are mechanically joined together by a collar that retains the first cam disc in a desired rotational orientation and axial spacing relative to the second cam disc.

11. The valve assembly of claim 10, wherein the collar has a collar through hole that receives the cam shaft therein.

12. The valve assembly of claim 11, wherein an inner surface of the collar through hole has a cross-sectional shape and dimensions configured so that the collar rotates in concert with the cam shaft.

13. The valve assembly of claim 11, wherein the collar through hole is centered on the rotational axis.

14. The valve assembly of claim 1, wherein the first cam disc includes a collar that protrudes from a first cam inner surface, the collar surrounds a first cam through opening, and an outer surface of the collar has a surface feature that engages an inner surface of the second cam through opening whereby the first cam disc is retained in a desired rotational orientation and axial spacing relative to the second cam disc.

15. The valve assembly of claim 1, wherein the valves comprise at least one sliding gate valve, each of the at least one sliding gate valves including a first stationary plate that provides the valve seat, the first stationary plate having a first plate through-opening, the first stationary plate being disposed in the assembly housing and fixed relative to the assembly housing so as to face a first one of the valve ports, and a movable plate that provides the valve body, the movable plate having a movable plate through-opening, the movable plate being disposed in the assembly housing in a stacked arrangement with respect to the first stationary plate such that a surface of the movable plate slides along a surface of the first stationary plate upon actuation of the valve between a first position in which the movable plate through opening is aligned with the stationary plate through opening and fluid is permitted to flow through the valve port and a second position in which the movable plate through opening is not aligned with the stationary plate through opening and fluid is prevented from flowing through the valve port, the movable plate including a leg that protrudes toward the cam shaft, the leg terminating in a cam follower that is mechanically enmeshed with the cam track of a respective one of the cams in such a way that rotation of the cam results in movement of the movable plate within a plane that is parallel to the first stationary plate.

16. The valve assembly of claim 15, comprising a second stationary plate having a second plate through-opening, the second stationary plate being parallel to the first stationary plate, disposed in the assembly housing and fixed relative to the assembly housing so as to face a second one of the ports and such that the second plate through opening is aligned with the first plate through-opening, wherein the moveable plate is disposed between the first stationary plate and the second stationary plate.

17. The valve assembly of claim 15, comprising:

a first valve seal that is disposed between the first stationary plate and the assembly housing, the first valve seal surrounding a first one of the valve ports and providing a fluid tight seal between the first stationary plate and the assembly housing; and a second valve seal that is disposed between the second stationary plate and the assembly housing, the second valve seal surrounding a second one of the valve ports and providing a fluid tight seal between the second stationary plate and the assembly housing.

* * * * *